US008810067B2

(12) United States Patent
Kim et al.

(10) Patent No.: US 8,810,067 B2
(45) Date of Patent: Aug. 19, 2014

(54) POWER SUPPLY APPARATUS (75) Inventors: Beom-Gyu Kim, Yongin-si (KR);
Susumu Segawa, Yongin-si (KR);
Eui-Jeong Hwang, Yongin-si (KR);
Se-Sub Sim, Yongin-si (KR);
Jong-Woon Yang, Yongin-si (KR);
Han-Seok Yun, Yongin-si (KR);
Jin-Wan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 661 days.

(21) Appl. No.: 13/018,343

(22) Filed: Jan. 31, 2011

(65) Prior Publication Data
US 2012/0025615 A1 Feb. 2, 2012

(30) Foreign Application Priority Data
Jul. 28, 2010 (KR) .................. 10-2010-0072975

(51) Int. Cl.
*H02J 7/00* (2006.01)
(52) U.S. Cl.
USPC ........................................................ 307/65
(58) Field of Classification Search
USPC ........................................................ 307/65
See application file for complete search history.

(56) References Cited

U.S. PATENT DOCUMENTS

2006/0233000 A1*  10/2006  Akagi ........................ 363/37
2008/0290733 A1*  11/2008  Takahashi et al. .......... 307/66
2009/0236916 A1    9/2009  Nishimura
2011/0148205 A1*   6/2011  Moon .......................... 307/65
2011/0291479 A1*  12/2011  Lee ............................ 307/43

FOREIGN PATENT DOCUMENTS

| JP | 2008-54473 | 3/2008 |
| KR | 10-2000-0072680 | 12/2000 |
| KR | 1020010038473 A | 5/2001 |
| KR | 100315771 B1 | 11/2001 |
| KR | 1020020059543 A | 7/2002 |
| KR | 1020060102667 A | 9/2006 |

OTHER PUBLICATIONS

Korean Office action dated Aug. 11, 2011 issued to priority application No. 10-2010-0072975, listing the cited references in this IDS, 5 pages.

* cited by examiner

*Primary Examiner* — Robert L. Deberadinis
(74) *Attorney, Agent, or Firm* — Christie, Parker & Hale, LLP (57) ABSTRACT A power supply apparatus is disclosed. The power supply apparatus includes a rechargeable battery and a battery management system (BMS) for managing charging and discharging of the battery. The power supply apparatus is configured to supply an operating power to the BMS from an external power of an external power source when the external power source is in a normal state and is capable of supplying the external power to a load through the power supply apparatus. The power supply apparatus is further configured to supply the operating power to the BMS from electric energy stored in the battery when the external power source is in a state different from the normal state and not capable of supplying the external power to the load through the power supply apparatus.

17 Claims, 6 Drawing Sheets

POWER SUPPLY APPARATUS

CROSS-REFERENCE TO RELATED APPLICATIONS

This application claims priority to and the benefit of Korean Patent Application No. 10-2010-0072975, filed on Jul. 28, 2010 in the Korean Intellectual Property Office, the entire content of which is incorporated herein by reference.

BACKGROUND

1. Field

Aspects of embodiments according to the present invention relate to a power supply apparatus.

2. Description of the Related Art

Some power supply apparatuses temporarily supply power to a load (e.g., a device, such as a computing device) to prevent damage to the load or to preserve data processed by the load when a power source for supplying power to the load malfunctions and power interruption occurs. These power supply apparatuses include batteries for storing electric energy, and when the power source for supplying power to the load malfunctions as described above, the electric energy stored in the batteries is provided to the load. In addition, these power supply apparatuses include battery management systems for managing the batteries, for example, for sensing states of the batteries or managing charge and discharge operations of the batteries.

SUMMARY

One or more embodiments of the present invention include a power supply apparatus for stably supplying power to a battery management system. Additional aspects will be set forth in part in the description that follows and, in part, will be apparent from the description, or may be learned by practice of the presented embodiments.

According to an exemplary embodiment of the present invention, a power supply apparatus is provided. The power supply apparatus includes a rechargeable battery and a battery management system (BMS). The BMS is for managing charging and discharging of the battery. The power supply apparatus is configured to supply an operating power to the BMS from an external power of an external power source when the external power source is in a normal state and is capable of supplying the external power to a load through the power supply apparatus. The power supply apparatus is further configured to supply the operating power to the BMS from electric energy stored in the battery when the external power source is in a state different from the normal state and is not capable of supplying the external power to the load through the power supply apparatus.

The power supply apparatus may include an uninterruptible power supply apparatus.

The power supply apparatus may further include a power supply circuit for supplying the operating power to the BMS.

The power supply circuit may include a power converter for converting the external power to a first direct current power. The power supply circuit may be configured to supply the first direct current power to the BMS when the external power source is in the normal state.

The power supply circuit may be further configured to supply the external power to the load when the external power source is in the normal state.

The power supply circuit may include a first power converter, a second power converter, and a third power converter. The first power converter is for converting the external power to a first direct current power. The second power converter is for converting the first direct current power to a first alternating current power. The third power converter is for converting the first alternating current power to a second direct current power. The power supply circuit may be configured to supply the second direct current power to the BMS when the external power source is in the normal state.

The power supply circuit may be further configured to supply the first alternating current power to the load when the external power source is in the normal state.

The power supply circuit may include a first power converter and a second power converter. The first power converter is for converting the electric energy stored in the battery to a first alternating current power. The second power converter is for converting the first alternating current power to a first direct current power. The power supply circuit may be configured to supply the first direct current power to the BMS when the external power source is in the state different from the normal state.

The power supply circuit may be further configured to supply the first alternating current power to the load when the external power source is in the state different from the normal state.

According to another exemplary embodiment of the present invention, a power supply apparatus is disclosed. The power supply apparatus includes an input terminal, an output terminal, a rechargeable battery, a battery management system (BMS), a diode, a first power converter, a second power converter, and a third power converter. The input terminal is for connecting to an external power source and configured to receive an external power from the external power source. The output terminal is for supplying power to a load. The BMS is for managing charging and discharging of the battery. The diode is connected to and between the input terminal and the output terminal. The first power converter is connected to and between the input terminal and the battery. The second power converter is connected to and between the battery and the output terminal. The third power converter is connected to and between the output terminal and the BMS. The third power converter is configured to generate power for operating the battery management system by using the external power.

The power supply apparatus may further include a first switching device and a second switching device. The first switching device is connected to and between the input terminal and the first power converter. The second switching device is connected to and between the second power converter and the output terminal.

The second switching device may be further connected to and between the second power converter and the third power converter.

The power supply apparatus may further include a first node connected to and between the first power converter, the battery, and the second power converter.

According to yet another exemplary embodiment according to the present invention, a power supply apparatus is provided. The power supply apparatus includes an input terminal, an output terminal, a rechargeable battery, a battery management system (BMS), a first power converter, a second power converter, and a third power converter. The input terminal is for connecting to an external power source. The output terminal is for supplying power to a load. The BMS is for managing charging and discharging of the battery. The first power converter is connected to and between the input terminal and the battery. The second power converter is connected to and between the battery and the output terminal. The third power converter is connected to and between the output terminal and the BMS, and configured to generate power for operating the BMS by using power output by the second power converter.

The power supply apparatus may further include a first switching device, a second switching device, and a third switching device. The first switching device is connected to and between the input terminal and the first power converter. The second switching device is connected to and between the second power converter and the output terminal. The third switching device includes a terminal connected to the first and second power converters and another terminal connected to the battery.

The second switching device may be further connected to and between the second power converter and the third power converter.

The power supply apparatus may further include a first node connected to and between the first power converter, the battery, and the second power converter.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to like elements throughout. In addition, when a first element is referred to as being connected to a second element, the first element may be directly connected to the second element or indirectly connected to the second element through one or more third elements. In this regard, the present embodiments may have different forms as would be apparent to one of ordinary skill in the art, and should not be construed as being limited to the descriptions set forth herein. Accordingly, the embodiments are merely described below, by referring to the figures, to explain and illustrate aspects of the present invention.

Figure 1:
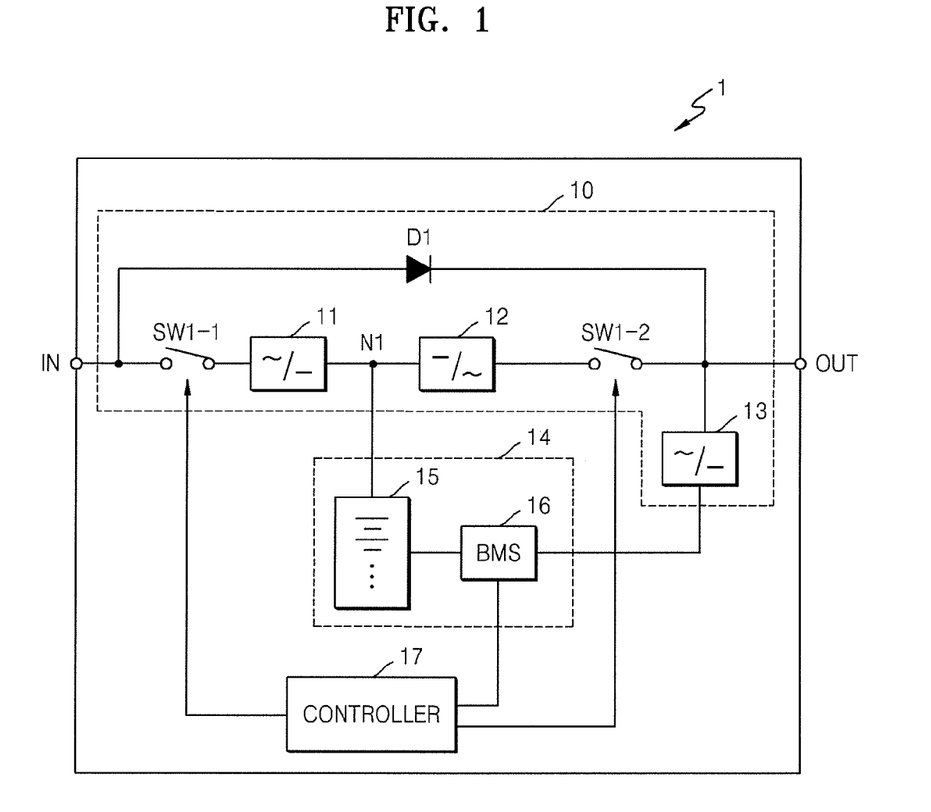
FIG. 1 is a block diagram of a power supply apparatus according to an embodiment of the present invention.

FIG. 1 is a block diagram of a power supply apparatus 1 according to an embodiment of the present invention.

Referring to FIG. 1, the power supply apparatus 1 includes a power supply circuit 10, a battery pack 14, and a controller 17. In addition, the power supply apparatus 1 includes an input terminal IN and an output terminal OUT.

The input terminal IN is connected to an external power source. Power (i.e., external power) that is supplied from the external power source—to be eventually supplied to a load—is applied to the input terminal IN. The output terminal OUT is connected to the load and outputs power to the load. In addition, when the external power source malfunctions and, for example, power interruption occurs, the output terminal OUT may output to the load first alternating current power generated using electric energy stored in a battery 15.

The power supply circuit 10 supplies operating power to the load and to a battery management system (BMS) 16. The power supply circuit 10 includes a first diode D1, a first switching device SW1-1, a second switching device SW1-2, a first power converter 11, a second power converter 12, and a third power converter 13.

The first diode D1 is connected to and interposed between the input terminal IN and the output terminal OUT and directly transmits the external power to the output terminal OUT without converting the external power. By connecting an anode of the first diode D1 to the input terminal IN and a cathode of the first diode D1 to the output terminal OUT, back-flow of a current is prevented.

The first switching device SW1-1 controls a supply of the external power input from the input terminal IN to the first power converter 11. When turned on, the first switching device SW1-1 supplies the external power to the first power converter 11. When turned off, the first switching device SW1-1 blocks the supply of the external power to the first power converter 11. The on/off operation of the first switching device SW1-1 may be controlled by the controller 17.

The first power converter 11 is connected to and interposed between the first switching device SW1-1 and a first node N1, converts the supplied external power to first direct current power, and outputs the first direct current power to the first node N1. That is, the first power converter 11 may be a rectifier or a converter for converting an alternating current to a direct current. The first power converter 11 controls the first direct current power to have a voltage that may be used to charge a battery.

The second power converter 12 is connected to and interposed between the first node N1 and the second switching device SW1-2. The second power converter 12 converts the first direct current power converted by the first power converter 11 or the electric energy stored in the battery 15 to the first alternating current power, and outputs the first alternating current power. That is, the second power converter 12 may be an inverter for converting a direct current to an alternating current. The second power converter 12 controls the first alternating current power to have a voltage that may be used in the load. In other embodiments, the second power converter 12 may allow magnitude or phase of the output first alternating current power to be substantially the same as that of the external power.

The second switching device SW1-2 controls a supply of the first alternating current power output by the second power converter 12 to the output terminal OUT. When turned on, the second switching device SW1-2 supplies the first alternating current power to the output terminal OUT. When turned off, the second switching device SW1-2 blocks the supply of the first alternating current power to the output terminal OUT. The on/off operation of the second switching device SW1-2 may be controlled by the controller 17.

The third power converter 13 is connected to and interposed between the output terminal OUT and the BMS 16. The third power converter 13 generates second direct current power as a driving power source for driving the BMS 16 by using the external power supplied through the first diode D1 or the electric energy stored in the battery 15. That is, the third power converter 13 may be a rectifier or a converter for converting an alternating current to a direct current. The third power converter 13 controls the second direct current power to have a voltage to be used as a power voltage that may be used by the BMS 16.

The battery pack 14 stores electric energy and, in some cases (for example, in emergency cases), supplies the electric energy to the load. The battery pack 14 includes the battery 15 and the BMS 16.

The battery 15 is a rechargeable secondary battery. The battery 15 may include a plurality of battery cells connected in series and/or parallel, or battery modules each including a plurality of battery cells connected in series and/or parallel. Since the battery 15 supplies the electric energy stored therein to the load in some cases, the battery 15 may include a battery cell with a large capacity. In the present embodiment of FIG. 1, one battery pack is illustrated. However, this is exemplary and, for example, the battery 15 may instead include a plurality of batteries connected in series and/or parallel.

The BMS 16 controls charge and discharge operations of the battery 15. That is, the BMS 16 operates as a protection circuit. The BMS 16 may include an analog front end (AFE) (not shown) for sensing, for example, a voltage, a current, and a temperature of the battery 15, and a control unit such as a microcomputer, integrated circuit, or the like, for controlling an operation of the AFE and for transmitting data to the controller 17 or to an external monitoring apparatus (not shown). The BMS 16 may perform the sensing operation and the communication (e.g., controlling) operation even in normal cases (that is, when the external power is being directly supplied to the output terminal OUT), as well as when the battery 15 is being charged or discharged. In other words, the BMS 16 may operate at all times.

In comparable embodiments, the electric energy stored in the battery 15 is used to operate the BMS 16. However, as described in the present embodiment above, the BMS 16 operates at all times and thus, the charge of the battery 15 for use in other cases (for example, emergency cases) is reduced from the battery's normal capacity. Accordingly, although the power consumed by the BMS 16 is small, there is nonetheless a benefit to reducing the power consumed from the battery 15 by the BMS 16. In addition, since the battery 15 has an output voltage that varies according to the kind of a battery cell or a series/parallel connection structure of a battery cell or a battery module used in the battery 15, it is difficult to generate a voltage from the battery 15 for operating the BMS 16 in consideration of the number of cases.

In the power supply apparatus 1 according to the present embodiment, in normal cases, the external power is used to supply power for operating the BMS 16, and in other cases (e.g., in emergency cases), for example, when power interruption occurs, the electric energy stored in the battery 15 is used to supply the power for operating the BMS 16. In this regard, since the third power converter 13 for producing the power for operating the BMS 16 receives, as an input, the external power or the first alternating current power, the third power converter 13 produces the power for operating the BMS 16 independently from the voltage that may be output by the battery 15. Here, the external power and the first alternating current power have similar characteristics to each other.

The controller 17 controls operations of respective components of the power supply apparatus 1. The controller 17 controls the on/off operations of the first switching device SW1-1 and the second switching device SW1-2. For example, if the electric energy stored in the battery 15 is depleted and the remaining amount is relatively small, the controller 17 may turn on the first switching device SW1-1 to supply power to the battery 15 so that the battery 15 is charged. Likewise, if the external power is not being supplied to the load, the second switching device SW1-2 may be turned on so that the electric energy stored in the battery 15 is supplied to the load.

The controller 17 senses abnormal states of the external power source and, in some cases (for example, emergency cases), enables the power supply apparatus 1 to perform an uninterruptible power supply (UPS) operation of a UPS apparatus. That is, in a normal state, in which the external power source provides the external power to the load, the controller 17 controls the power supply circuit 10 in such a way that external power is supplied to the load and external power is used to generate the power for operating the BMS 16. In addition, when the external power source is in an abnormal state, for example, when power interruption occurs, the controller 17 controls the power supply circuit 10 in such a way that the electric energy stored in the battery 15 is used to generate power to be supplied to the load and the power for operating the BMS 16.

Figure 2:
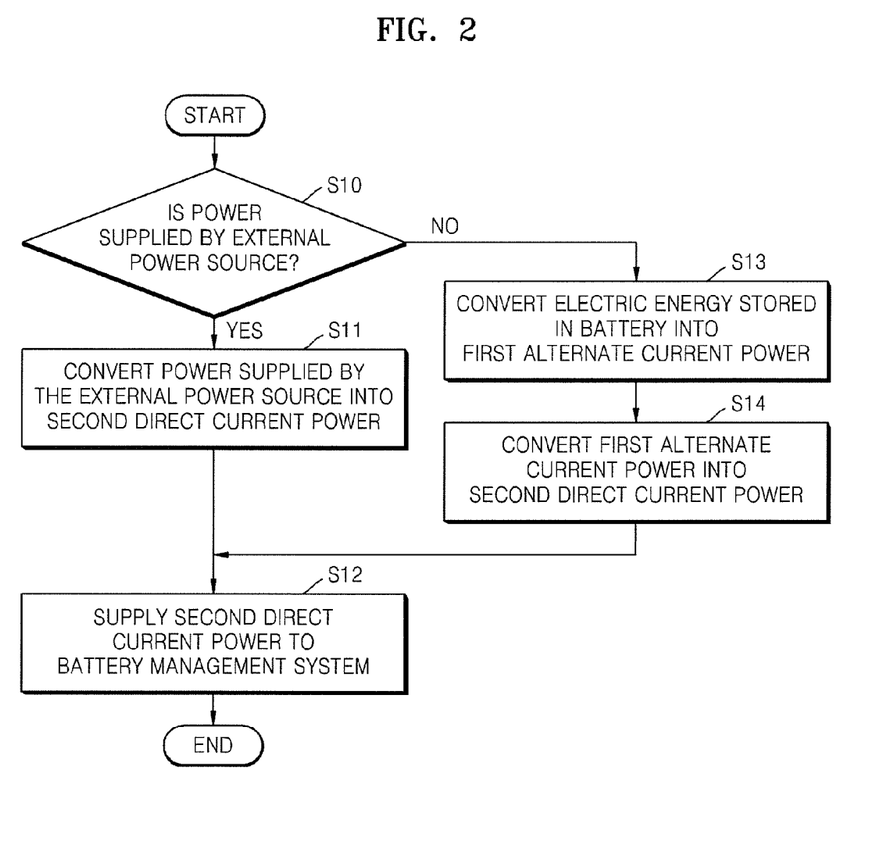
FIG. 2 is a flowchart illustrating a method of controlling a power supply apparatus according to an embodiment of the present invention.

Hereinafter, a method of supplying the power for operating the BMS 16 in the power supply apparatus 1 will be described in detail. FIG. 2 is a flowchart illustrating a method of controlling the power supply apparatus 1 according to an embodiment of the present invention.

Referring to FIG. 2, the controller 17 determines whether the external power source is supplying the external power (S10). For example, the controller 17 may determine, for example, whether the external power source is malfunctioning.

When the external power source is in a normal state and supplies the external power to the load, the external power is applied to the input terminal IN and the third power converter 13 of the power supply circuit 10 converts the external power to the second direct current power (S11). The second direct current power is supplied to the BMS 16, so that the external power is used as a source of the power for operating the BMS 16 (S12).

On the other hand, if, for example, the external power source is an abnormal state and does not supply the external power to the load, the external power is not applied to the input terminal IN. Accordingly, the power supply circuit 10 converts the electric energy stored in the battery 15 to the first alternating current power (S13). The first alternating current power is converted to the second direct current power (S14) and the second direct current power is supplied to the BMS 16 (S12).

As described above, when the external power source is in a normal state, the power supply apparatus 1 according to the present embodiment uses the external power to generate the power for operating the BMS 16. When the external power source is in other states (for example, an abnormal state), the power supply apparatus 1 uses the electric energy stored in the battery 15 as a source to generate the power for operating the BMS 16. This allows for a stable supply of the power for operating the BMS 16.

Figure 3:
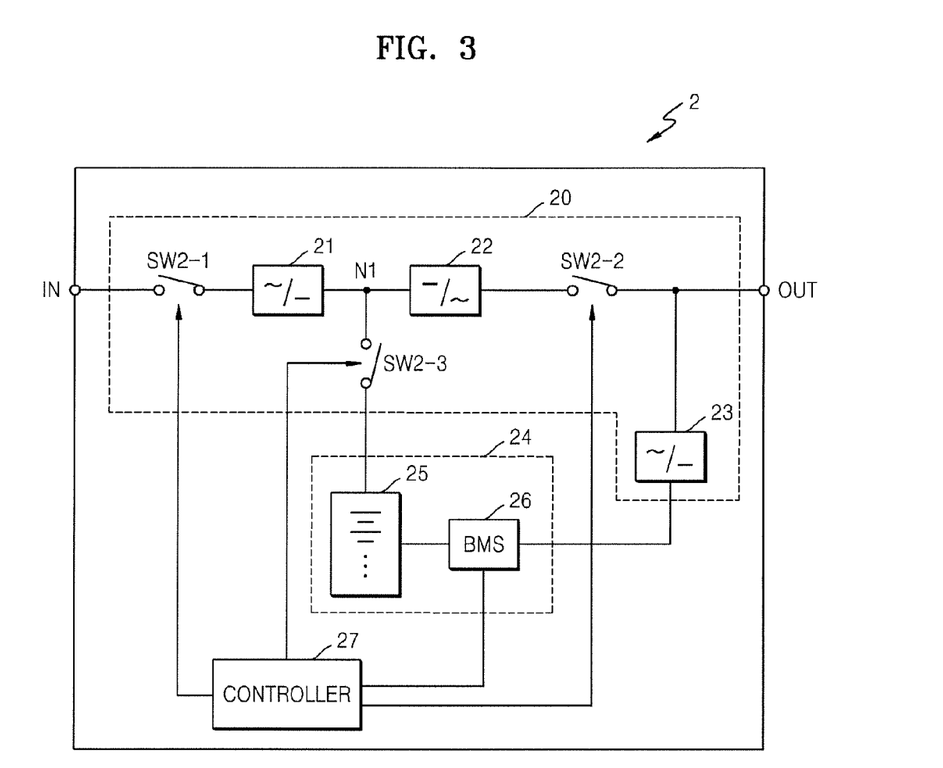
FIG. 3 is a block diagram of a power supply apparatus according to another embodiment of the present invention.

FIG. 3 is a block diagram of a power supply apparatus 2 according to another embodiment of the present invention. The power supply apparatus 2 has a structure and a function similar to those of the power supply apparatus 1 of FIG. 1, so descriptions of similarities between the power supply apparatuses 1 and 2 may not be repeated.

Referring to FIG. 3, the power supply apparatus 2 includes a power supply circuit 20, a battery pack 24, and a controller 27. In addition, the power supply apparatus 2 includes an input terminal IN and an output terminal OUT.

The power supply circuit 20 supplies operating power to the load and to a BMS 26. The power supply circuit 20 includes a first switching device SW2-1, a second switching device SW2-2, a third switching device SW2-3, a first power converter 21, a second power converter 22, and a third power converter 23.

The third switching device SW2-3, which is not included in the power supply circuit 10 of the embodiment of FIG. 1, is connected to and interposed between a first node N1 and a battery 25, and controls a supply of a first direct current power (from the first power converter 21) to the battery 25 or a supply of electric energy stored in the battery 25 to the second power converter 22. The third switching device SW2-3 is turned on when the battery 25 is to be charged or the electric energy stored in the battery 25 is to be supplied to the load, and when the battery 25 is not to be charged or discharged, the third switching device SW2-3 is turned off. The on/off operation of the third switching device SW2-3 may be controlled by the controller 27.

The controller 27 controls operations of respective components thereof. The controller 27 controls the on/off operations of the first switching device SW2-1 through the third switching device SW2-3. For example, when the external power source is in a normal state, the controller 27 turns on the first switching device SW2-1. When the electric energy stored in the battery 25 is depleted and the amount remaining is relatively small, the controller 27 may turn on the third switching device SW2-3 to supply the external power to the battery 25 so that the battery 25 is charged. In addition, the controller 27 may turn on the second switching device SW2-2 so that a first alternating current power (from the second power converter 22) is both supplied to the load and used to generate power (that is, a second direct current power) for operating the BMS 26.

On the other hand, when the external power source is in another state (for example, an abnormal state), the controller 27 may turn off the first switching device SW2-1. In addition, the controller 27 may turn on the second switching device SW2-2 and the third switching device SW2-3 so that the electric energy stored in the battery 25 is used as a source to supply the first alternating current power (via the second power converter 22). The first alternating current power is then supplied to the load (via the output terminal OUT) and to the third power converter 23 (to generate the second direct current power for operating the BMS 26).

The controller 27 may sense abnormal states of the external power source and, in some cases (for example, in emergency cases), enable the power supply apparatus 2 to perform a UPS operation of a UPS apparatus. That is, in a normal state, in which the external power source provides the external power to the load, the controller 27 controls the power supply circuit 20 in such a way that the external power is supplied to the load and the external power is used to generate the power for operating the BMS 26. In addition, when the external power source is in another state (for example, an abnormal state), the controller 27 controls the power supply circuit 20 in such a way that the electric energy stored in the battery 25 is used to generate the first alternating current power and the power for operating the BMS 26.

Figure 4:
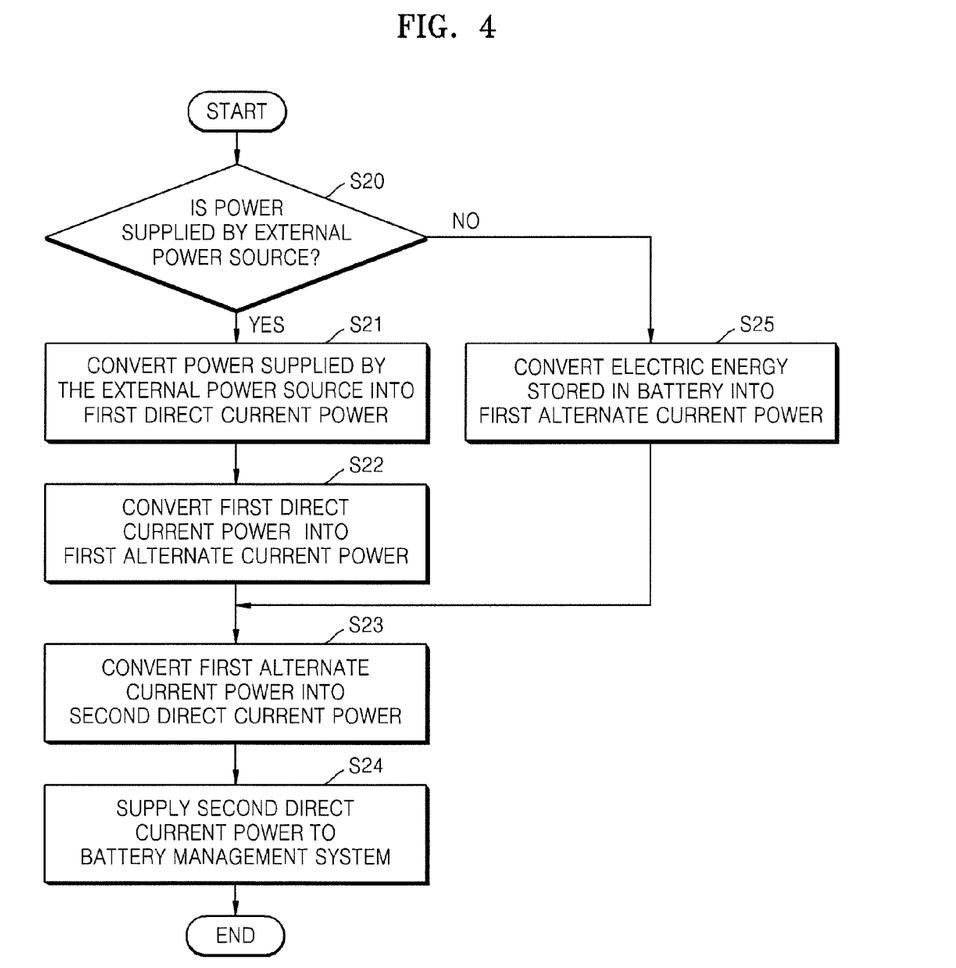
FIG. 4 is a flowchart illustrating a method of controlling a power supply apparatus according to another embodiment of the present invention.

Hereinafter, a method of supplying the power for operating the BMS 26 in the power supply apparatus 2 will be described in detail. FIG. 4 is a flowchart illustrating a method of managing the power supply apparatus 2 according to another embodiment of the present invention.

Referring to FIG. 4, the controller 27 determines whether the external power source is supplying the external power (S20). That is, the controller 27 may determine, for example, whether the external power source is malfunctioning.

When the external power source is in a normal state and supplies the external power to the load, the external power is applied to the input terminal IN and the first power converter 21 converts the external power to the first direct current power (S21). In addition, the second power converter 22 converts the first direct current power to the first alternating current power (S22). The first alternating current power may be supplied to the load.

Further, the third power converter 23 converts the first alternating current power to the second direct current power (S23). The third power converter 23 also supplies the second direct current power to the BMS 26, thereby enabling the external power to be used as a source of the power for operating the BMS 26 (S24).

On the other hand, if, for example, the external power source is an abnormal state and does not supply the external power to the load, the external power is not applied to the input terminal IN. Accordingly, the second power converter 22 of the power supply circuit 20 converts the electric energy stored in the battery 25 to the first alternating current power (S25). The first alternating current power undergoes the operations S23 and S24 and is then supplied to the BMS 26.

As described above, when the external power source is in a normal state, the power supply apparatus 2 uses the external power as a source to generate the power for operating the BMS 26, and when the external power source is in other states (for example, an abnormal state), the power supply apparatus 2 uses the electric energy stored in the battery 25 as a source to generate the power for operating the BMS 26. This allows for a stable supply of the power for operating the BMS 26.

Figure 5:
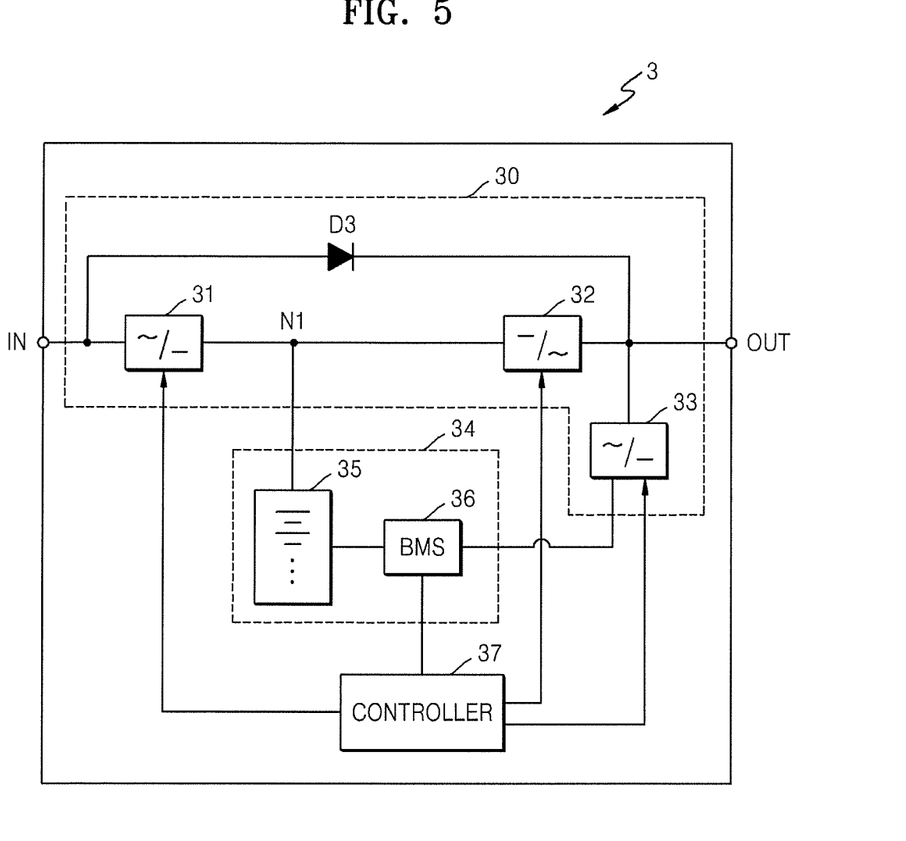
FIG. 5 is a block diagram of a power supply apparatus according to another embodiment of the present invention.

FIG. 5 is a block diagram of a power supply apparatus 3 according to another embodiment of the present invention. The power supply apparatus 3 has a structure and a function similar to those of the power supply apparatus 1 of FIG. 1, so descriptions of similarities between the power supply apparatuses 1 and 3 may not be repeated.

Referring to FIG. 5, the power supply apparatus 3 includes a power supply circuit 30, a battery pack 34 (which includes a battery 35 and a BMS 36), and a controller 37. In addition, the power supply apparatus 3 includes an input terminal IN and an output terminal OUT.

The power supply circuit 30 includes a first diode D3, a first power converter 31, a second power converter 32, and a third power converter 33. That is, the power supply circuit 30 is different from the power supply circuit 10 of FIG. 1 in that the switching devices of FIG. 1 are not used. The controller 37 controls, instead of the on/off operations of the switching devices, operations of the first through third power converters 31 through 33 in such a way that, if necessary, power applied to input terminals of the first through third power converters 31 through 33 is converted to an alternating current or a direct current, and the alternating current or direct current is output to output terminals of the first through third power converters 31 through 33.

When the external power source is in a normal state, the controller 37 may only control the third power converter 33 that supplies power for operating the BMS 36. If electric energy stored in the battery 35 is depleted and the remaining amount is relatively small such that the battery 35 should be charged, the controller 37 may control the first power converter 31 to operate so that a first direct current power (from the first power converter 31) is supplied to the battery 35. On the other hand, when the external power source is in another state (for example, an abnormal state), the controller 37 may control the second power converter 32 and the third power converter 33 to operate so that the electric energy stored in the battery 35 may be used to generate a first alternating current power (from the second power converter 32) and a second direct power (from the third power converter 33) for operating the BMS 36.

As described above, when the external power source is in a normal state, the power supply apparatus 3 uses the external power to generate the power for operating the BMS 36. On the other hand, when the external power source is in other states (for example, an abnormal state), the power supply apparatus 3 uses the electric energy stored in the battery 35 as a source to generate the power for operating the BMS 36. This allows for a stable supply of the power for operating the BMS 36.

Figure 6:
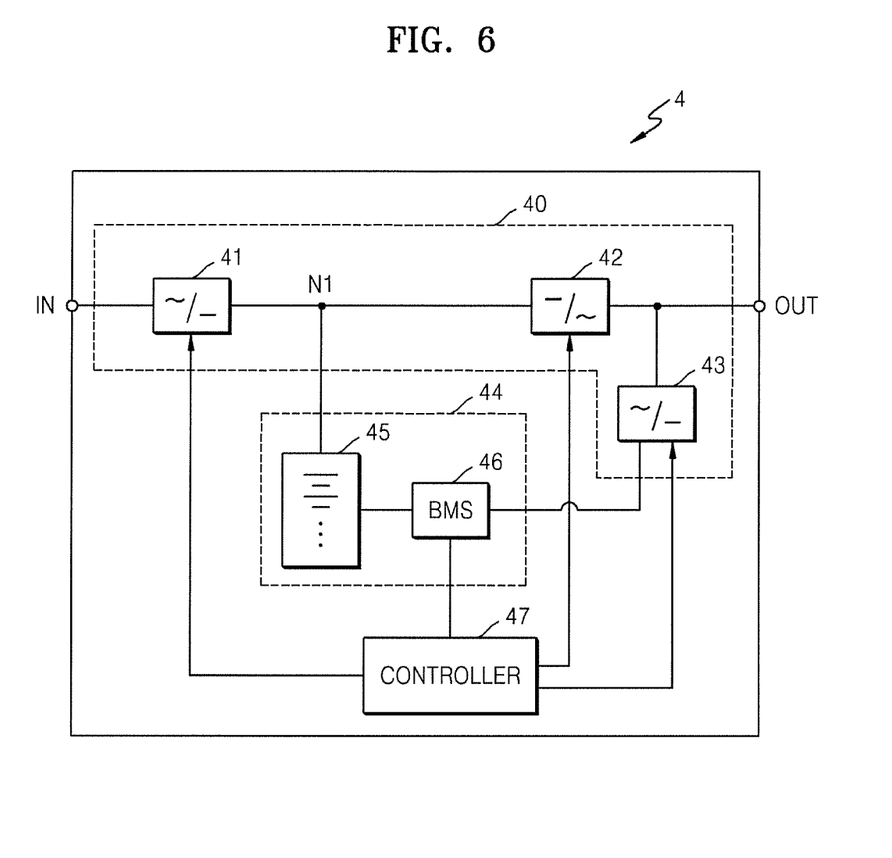
FIG. 6 is a block diagram of a power supply apparatus according to another embodiment of the present invention.

FIG. 6 is a block diagram of a power supply apparatus 4 according to another embodiment of the present invention. The power supply apparatus 4 has a structure and a function similar to those of the power supply apparatus 2 of FIG. 3, so descriptions of similarities between the power supply apparatuses 2 and 4 may not be repeated.

Referring to FIG. 6, the power supply apparatus 4 includes a power supply circuit 40, a battery pack 44 (which includes a battery 45 and a BMS 46), and a controller 47. In addition, the power supply apparatus 4 includes an input terminal IN and an output terminal OUT.

The power supply circuit 40 includes a first power converter 41, a second power converter 42, and a third power converter 43. That is, the power supply circuit 40 is different from the power supply circuit 20 of FIG. 3 in that the switching devices of FIG. 3 are not used.

Further, the controller 47 controls, instead of the on/off operations of the switching devices, operations of the first through third power converters 41 through 43 in such a way that, if necessary, power applied to input terminals of the first through third power converters 41 through 43 is converted to an alternating current or a direct current, and the alternating current or direct current is output to output terminals of the first through third power converters 41 through 43. In addition, when a first direct current (from the first power converter 41) is supplied to the battery pack 44, the controller 47 controls the BMS 46 in such a way to control the charging of the battery 45.

When the external power source is in a normal state, the controller 47 may control the first through third power converters 41 through 43 to operate so that power may be concurrently supplied to the BMS 46 and to the load. If electric energy stored in the battery 45 is depleted and the amount remaining is relatively small such that the battery 45 should be charged, the controller 47 may control the BMS 46 to supply the first direct current power to the battery 45. In addition, when the external power source is in another state (for example, an abnormal state), the controller 47 may control the second power converter 42 and the third power converter 43 to operate so that the electric energy stored in the battery 45 may be used to generate a first alternating current power (from the second power converter 42) and a second direct power (from the third power converter 43) for operating the BMS 46.

As described above, when the external power source is in a normal state, the power supply apparatus 4 uses the external power as a source to generate the power for operating the BMS 46. On the other hand, when the external power source is in other states (for example, an abnormal state), the power supply apparatus 4 uses the electric energy stored in the battery 45 as a source to generate the power for operating the BMS 46. This allows for a stable supply of the power for operating the BMS 46.

A program for executing the controlling methods according to the embodiments described above and modified examples thereof in the power supply apparatuses 1 to 4 may be stored in a recording medium. In this regard, the recording medium may be a medium that is readable by a processor. An example of the recording medium is a semiconductor recording medium, for example, a flash memory. The recording medium may be readable and the program may be executed by a processor.

It should be understood that the exemplary embodiments described herein should be considered in a descriptive sense only and not for purposes of limitation. Descriptions of features or aspects within each embodiment should be considered as available for other similar features or aspects in other embodiments. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A power supply apparatus comprising:
a rechargeable battery; and
a battery management system (BMS) for managing charging and discharging of the battery,
wherein the power supply apparatus is configured to
supply an operating power independent of the battery to the BMS from an external power of an external power source when the external power source is in a normal state and is capable of supplying the external power to a load through the power supply apparatus, and
supply the operating power to the BMS from electric energy stored in the battery when the external power source is in a state different from the normal state and is not capable of supplying the external power to the load through the power supply apparatus.

2. The power supply apparatus of claim 1, wherein the power supply apparatus comprises an uninterruptible power supply apparatus.

3. The power supply apparatus of claim 1, further comprising a power supply circuit for supplying the operating power to the BMS.

4. The power supply apparatus of claim 3, wherein
the power supply circuit comprises a power converter for converting the external power to a first direct current power, and
the power supply circuit is configured to supply the first direct current power to the BMS when the external power source is in the normal state.

5. The power supply apparatus of claim 4, wherein the power supply circuit is further configured to supply the external power to the load when the external power source is in the normal state.

6. The power supply apparatus of claim 3, wherein
the power supply circuit comprises:
a first power converter for converting the external power to a first direct current power;
a second power converter for converting the first direct current power to a first alternating current power; and
a third power converter for converting the first alternating current power to a second direct current power, and
the power supply circuit is configured to supply the second direct current power to the BMS when the external power source is in the normal state.

7. The power supply apparatus of claim 6, wherein the power supply circuit is further configured to supply the first alternating current power to the load when the external power source is in the normal state.

8. The power supply apparatus of claim 3, wherein
the power supply circuit comprises:
- a first power converter for converting the electric energy stored in the battery to a first alternating current power; and
- a second power converter for converting the first alternating current power to a first direct current power, and the power supply circuit is configured to supply the first direct current power to the BMS when the external power source is in the state different from the normal state.

9. The power supply apparatus of claim 8, wherein the power supply circuit is further configured to supply the first alternating current power to the load when the external power source is in the state different from the normal state.

10. A power supply apparatus comprising:
- an input terminal for connecting to an external power source and configured to receive an external power from the external power source;
- an output terminal for supplying power to a load;
- a rechargeable battery;
- a battery management system (BMS) for managing charging and discharging of the battery;
- a diode connected to and between the input terminal and the output terminal;
- a first power converter connected to and between the input terminal and the battery;
- a second power converter connected to and between the battery and the output terminal; and
- a third power converter connected to and between the output terminal and the BMS, and configured to generate power for operating the BMS by using the external power.

11. The power supply apparatus of claim 10, further comprising:
- a first switching device connected to and between the input terminal and the first power converter; and
- a second switching device connected to and between the second power converter and the output terminal.

12. The power supply apparatus of claim 11, wherein the second switching device is further connected to and between the second power converter and the third power converter.

13. The power supply apparatus of claim 10, further comprising a first node connected to and between the first power converter, the battery, and the second power converter.

14. A power supply apparatus comprising:
- an input terminal for connecting to an external power source and receiving an external power from the external power source;
- an output terminal for supplying power to a load;
- a rechargeable battery;
- a battery management system (BMS) for managing charging and discharging of the battery;
- a first power converter connected to and between the input terminal and the battery;
- a second power converter connected to and between the battery and the output terminal; and
- a third power converter connected to and between the output terminal and the BMS, and configured to generate power for operating the BMS by using power output by the second power converter, wherein the power supply apparatus is configured to generate the power for operating the BMS independently from a voltage output by the battery when the external power source is in a normal state and is capable of supplying the external power to the load through the power supply apparatus.

15. A power supply apparatus comprising:
- an input terminal for connecting to an external power source;
- an output terminal for supplying power to a load;
- a rechargeable battery;
- a battery management system (BMS) for managing charging and discharging of the battery;
- a first power converter connected to and between the input terminal and the battery;
- a second power converter connected to and between the battery and the output terminal;
- a third power converter connected to and between the output terminal and the BMS, and configured to generate power for operating the BMS by using power output by the second power converter;
- a first switching device connected to and between the input terminal and the first power converter;
- a second switching device connected to and between the second power converter and the output terminal; and
- a third switching device comprising a terminal connected to the first and second power converters and another terminal connected to the battery.

16. The power supply apparatus of claim 15, wherein the second switching device is further connected to and between the second power converter and the third power converter.

17. The power supply apparatus of claim 14, further comprising a first node connected to and between the first power converter, the battery, and the second power converter.

* * * * *